Dec. 23, 1958 — H. M. HENSOLDT — 2,865,104
UNIVERSAL MEASURING INDICATOR
Filed March 8, 1956 — 6 Sheets-Sheet 1

FIG. 1

INVENTOR
Hans Moritz Hensoldt
BY
ATTORNEYS

Dec. 23, 1958　　　H. M. HENSOLDT　　　2,865,104
UNIVERSAL MEASURING INDICATOR
Filed March 8, 1956　　　6 Sheets-Sheet 2

FIG. 2

INVENTOR
Hans Moritz Hensoldt
BY
ATTORNEYS

Dec. 23, 1958  H. M. HENSOLDT  2,865,104
UNIVERSAL MEASURING INDICATOR
Filed March 8, 1956  6 Sheets-Sheet 3

INVENTOR
Hans Moritz Hensoldt
BY
ATTORNEYS

Dec. 23, 1958     H. M. HENSOLDT     2,865,104
UNIVERSAL MEASURING INDICATOR
Filed March 8, 1956                                                      6 Sheets-Sheet 4

INVENTOR
Hans Moritz Hensoldt
BY
ATTORNEYS

Dec. 23, 1958 H. M. HENSOLDT 2,865,104
UNIVERSAL MEASURING INDICATOR
Filed March 8, 1956 6 Sheets-Sheet 5

FIG. 9

INVENTOR
Hans Moritz Hensoldt
BY
ATTORNEYS

Dec. 23, 1958     H. M. HENSOLDT     2,865,104
UNIVERSAL MEASURING INDICATOR Filed March 8, 1956                                 6 Sheets-Sheet 6

INVENTOR
Hans Moritz Hensoldt
BY
ATTORNEYS

United States Patent Office 2,865,104
Patented Dec. 23, 1958

2,865,104

UNIVERSAL MEASURING INDICATOR

Hans Moritz Hensoldt, Wetzlar, Hesse, Germany

Application March 8, 1956, Serial No. 570,364

Claims priority, application Germany March 11, 1955

13 Claims. (Cl. 33—1)

This invention relates to a device for carrying out analyses, measurements and comparison tests of area or line patterns which are visible on the screen of the device. The device, called a universal measuring indicator, is comprised of a preferably plane casing with a measuring field where the area or line patterns visible on the screen can be scanned by means of a rectangular coordinate system, or where the comparison tests can be made with so-called gauge patterns. The position of the abscissa and of the ordinate of the coordinate system is variable with regard to each other and each position can be read from the marginal scales of the measuring field. By varying successively the position of the ordinate of the coordinate system in one direction, the total width of the measuring field is subdivided successively into small strips which are passed over by the position-variable abscissa of the coordinate system in vertical direction, from the bottom to the top or vice versa. The lengths of the part or single parts determined on the screen yield then, multiplied by the respective equal jump of the lateral displacement, the size of the single part to be measured.

The evaluation can concern a whole surface or single surfaces or the percentile determination of single surfaces to the total surface appearing in the measuring field, that is, the determination of the share of the single surfaces in the total surface.

To avoid the necessity of recording each individual value of the length of the total surface passed over by the abscissa, a counter assembly is provided in the device, according to a feature of the invention, which registers the values of the individual measured lengths so that after the evaluation for each partial group, the entire length can be read. The counter assembly is so designed that several individual counters are provided of which one is connected at a time. The connection of each counter is so coupled that only one counter is connected and secured in each case, that is, that a connected counter returns automatically into rest position when another counter is connected.

The area patterns to be evaluated or measured can appear on the screen of the device by projection, or, particularly in comparison tests, they can be inserted in the measuring field by means of photographs, diapositives or gauge patterns or they can be pushed in by means of a frame.

According to another feature of the invention the screen of the measuring field can be a fixed projection surface with different areas, markings and the like. This screen is preferably transparent so that when a light source is arranged underneath the screen the latter and the superposed picture can be illuminated.

The screen can also be arranged as a surface moving preferably underneath the measuring field, serving at the same time as a carrier for one axis of the coordinate system. The screen can be designed in this case, for example, as a gauge plate with plane profile lines or as a goniometer, etc.

The device according to the invention can be used for medical examinations, for example, for counting the blood picture, cell tissues and the like, also in metallurgy in the evaluation of metal sections, for example, or in determining the composition of ores or rocks or for the investigation of thin sections of plants or materials, in short, wherever a plane representation of a sectional area or a material inserted between plane object glass carriers is to be examined or evaluated or where certain dimensions or shapes are to be tested in the manufacture of minute parts in precision mechanics.

The device is of particular advantage in connection with a microscope whose picture formed in the eyepiece is enlarged by means of a suitable prism and mirror system and projected on the screen of the measuring field of the device. An image formed in the eyepiece of a microscope can be evaluated in known manner in the eyepiece itself by means of a special micrometer device. But this method has the great disadvantage that the examiner can only observe with one eye, and since the evaluation of the pictures requires a long time, frequently several hours or even days, the evaluation is very strenuous.

With the device according to the invention it is possible to carry out evaluations in a very simple manner and without any complicated calculations, particularly by using both eyes so that the disadvantage of the one-eyed monocular observation in the microscope is eliminated, because the image formed in the microscope is projected enlarged into the measuring field. The performance of the investigations is thus greatly simplified and facilitated and particularly requires much less time than evaluations with known devices.

Other advantages and details of the invention will be seen from the description of a preferred embodiment of the invention represented in the attached drawing, where.

The device to be used as a universal measuring indicator consists of a flat substantially rectangular casing 1 in whose cover surface 2 is arranged a preferably square cutout limited by the sides 3, 4, 5, 6 which forms the measuring field of the device. Two adjoining sides of the measuring field, for example 3 and 4, are provided each with a scale 8 and 9 with equal division. The scales can have a millimeter graduation or any graduation necessary for the performance of the measurement.

Figure 5:
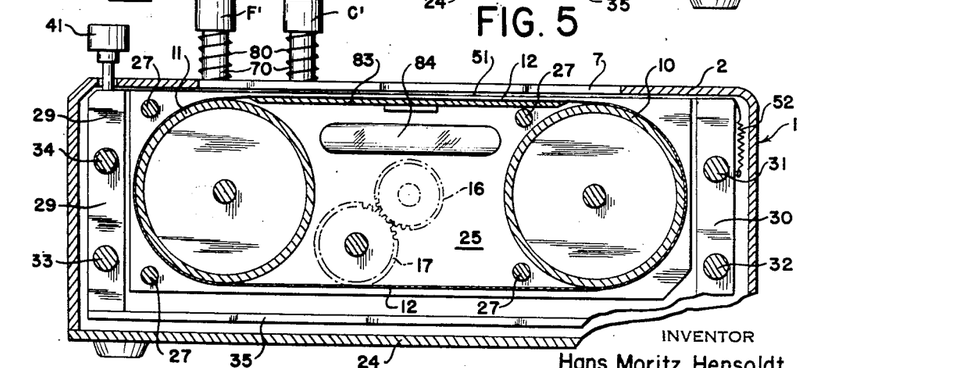
Figures 8, 10:
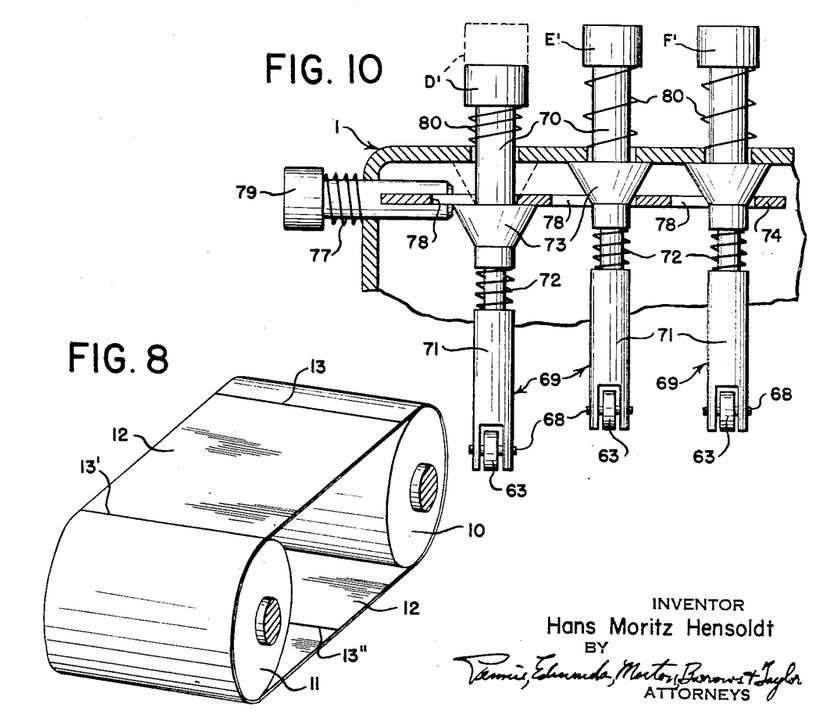
Fig. 8 is a perspective view of a screen in the form of a paper loop.
Fig. 10 is a broken sectional view of the operating elements of the counter taken along the line X—X of Fig. 3.

Below the measuring field 7 are arranged two rollers, so-called conveyer rollers 10 and 11, for a screen designed preferably as an endless cloth or paper belt 12

(Figs. 5 and 8). This screen covers the measuring field toward the interior of the device and is provided with a horizontal line 13 extending over the entire width. A taut wire may be used in place of the line 13. Particularly advantageous is the operation of the device if the circumference of the paper belt is an even multiple of the distance of the sides 3 and 5 of the measuring field. This makes it possible to provide several horizontal lines 13, 13', 13" in the distance of the sides 3 and 5 on the paper belt so that a new line always enters the measuring field when the preceding one disappears from the measuring field during the motion of the paper belt. One of the rollers, for example, the roller 10, can be driven by suitable means by hand or by a small electro-motor. In the represented embodiment the drive is effected by a crank 15 provided at the right side wall 14 of the casing. The revolutions of the crank are transmitted by a corresponding gear train 16 to 21 to the roller 10. The roller 11 can be moved by suitable means, for example, by tension or compression springs 22 and 23, away from the roller 10 so that the paper belt 12 applied on the rollers 10 and 11 is always taut.

Figure 4:
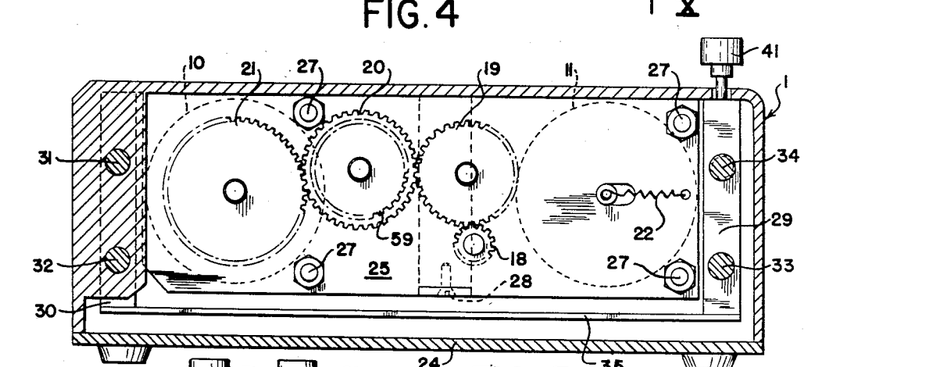

The rollers 10 and 11 and the gear train consisting of the gear wheels 19 to 21 are preferably supported in a frame which can be inserted in the casing from below since it provided with a detachable casing bottom 24. The frame consists of two side bars 25, 26, which are rigidly connected with each other by several spacers 27. The frame is fixed immovably in the casing, for example, by means of screws 28. Outside the conveyer rollers 10 and 11 but inside the casing are arranged two slides 29, 30 at opposite sides but in alignment with each other, which are guided parallel to the conveyer roller by means of rails 31 to 34 (Figs. 2, 4 and 5) secured in the casing. Both slides are rigidly connected with each other by a side bar 35. One of the rails, for example 34, is formed as a threaded spindle which is turned by means of the knob 36 and coupled in known manner with the slide 29 by means of a threaded lock.

Figure 6A:
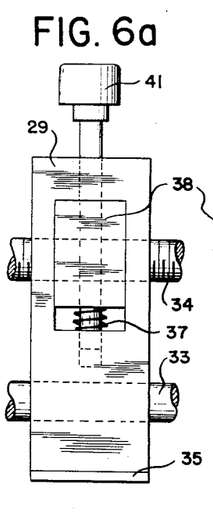
Figs. 6a and 6b are respectively a side view of a slide assembly with threaded lock and an enlarged representation of a detail in a front view.
Figure 6B:
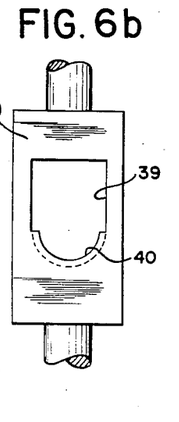

Figs. 6a, 6b and 7a, 7b show two embodiments of a slide with threaded lock. In Fig. 6a a threaded lock 38 which is displaceable against the action of a compression spring 37 is supported in the slide 29, this lock being provided, as shown in Fig. 6b, with a through hole 39 extending in the direction of the threaded spindle 34 and having a width corresponding to the diameter of the threaded spindle. The lower part of the hole is provided with semi-circular thread sections 40 which embrace partly the thread of the spindle 34, thus coupling the threaded spindle with the slide 29, so that both slides 29 and 30 are displaced parallel to the conveyer rollers 10 and 11 when the spindle is operated. The through hole 39 extends upward so far that, when the threaded lock is displaced downward against the action of the compression spring 37 by means of the knob 41, the latter is disengaged from the threaded spindle 34. Both slides 29 and 30 can thus be displaced together on the rails independent of the threaded spindle.

Figures 7A, 7B:
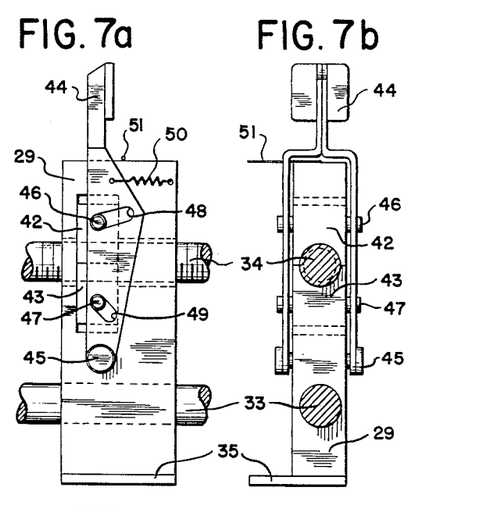
Figs. 7a and 7b are respectively side and front views of another embodiment of a sliding body with threaded lock.

Figs. 7a, 7b show another embodiment of a threaded lock. It is formed by two displaceable lock nut halves 42, 43, movable in opposite directions in the slide 29, these parts embracing each with their threaded parts half of the threaded spindle 34. The displacement of the lock nut parts is effected by an actuating lever 44 which laps over the slide 29 in the form of a fork and which is pivotally mounted on it by means of a shaft 45. Each half of the lock nut 42, 43 is provided with guide pilots 46, 47, which are guided in corresponding oblique slots 48, 49 of the actuating lever 44, extending in opposite directions. In the rest position of the actuating lever 44 the lock nut parts 42, 43, engage the threaded spindle 34. When the lever is actuated to the left in Fig. 7a against the action of a tension or compression spring 50 the parts 42, 43 are disengaged by the oblique slots 48, 49 and at the same time the slides 29, 30 are necessarily displaced.

On the slides 29, 30 is secured a thin linear part, for example, a thread or a steel wire 51 (Figs. 2 and 5) in such a way that it abuts directly on the paper belt 12. Preferably one end of the steel wire is secured by means of a tension spring 52 so that it is always tight. The thread or the steel wire 51 forms the ordinate and the line 13 on the paper belt 12 the abscissa of a rectangular coordinate system arranged in the measuring field 7.

With the device, as described so far, it is already possible to scan exactly any area pattern projected on the screen of the measuring field by means of the coordinate system and to determine individual partial areas in their longitudinal and lateral dimensions.

Figure 9:
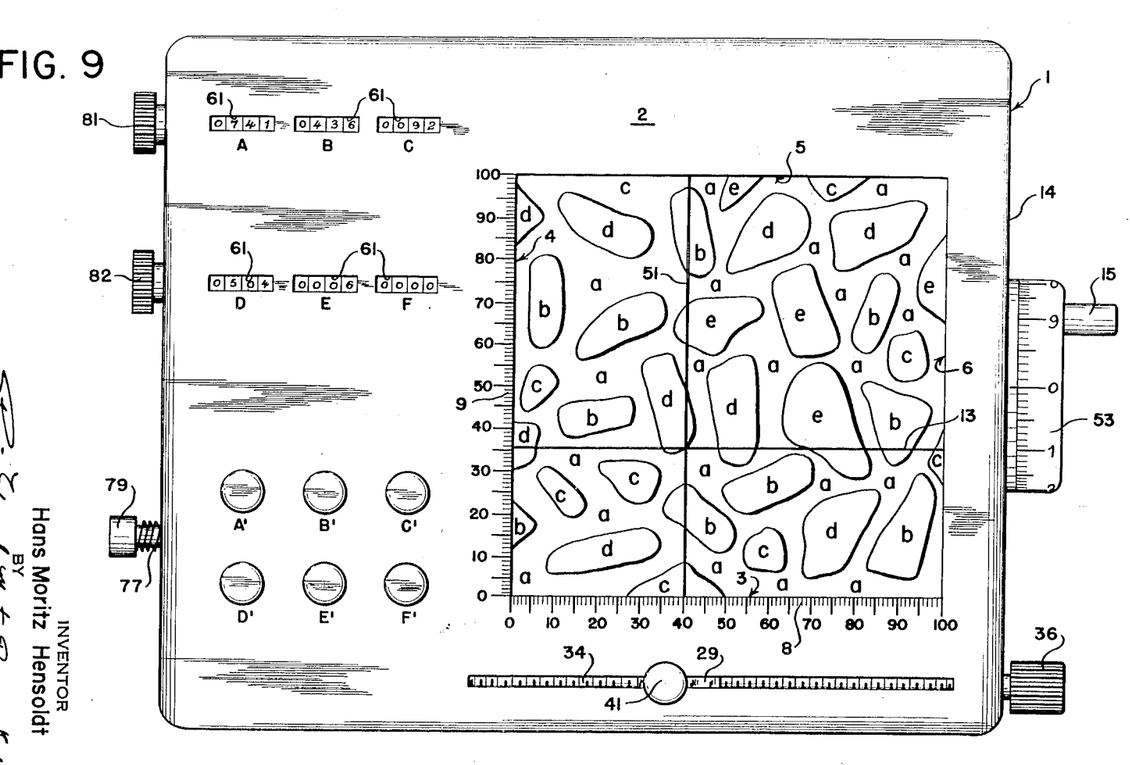
Fig. 9 is a top view of the device with projected or inserted area pattern to be evaluated.

In Fig. 9 it is assumed that an enlarged picture of any substance or material is projected into the measuring field. The main body of the substance is designated with a, and enclosed particles with b, c, d and e. The percentile portion of all equal parts in the total area is to be determined. To this end the ordinate 51 of the coordinate system is put on the first graduation of the scale 8 and by turning the crank 15 the abscissa is moved over the measuring field from the bottom to the top. Each length of the main body a and of the particles b, c, d and e, which is passed over by the abscissa below the ordinate, is registered separately for each particle. In order to obtain exact intermediate values on the scale 9, the crank 15 is provided with a vernier disk 53. As soon as the abscissa 13 has reached the side 5 of the measuring field the ordinate is displaced by one graduation to the right by means of the threaded spindle 34. When the crank 15 is turned further, the following line 13 forming the abscissa enters the measuring field, so that the next length of the main body and the particles lying perpendicularly under the ordinate 51 can be read and registered. This procedure is repeated until the total width of the measuring field has been scanned. In order to obtain the desired result, it is only necessary to add the lengths found for each surface particle and to multiply them by the desired division of the scale 9.

Figure 1:
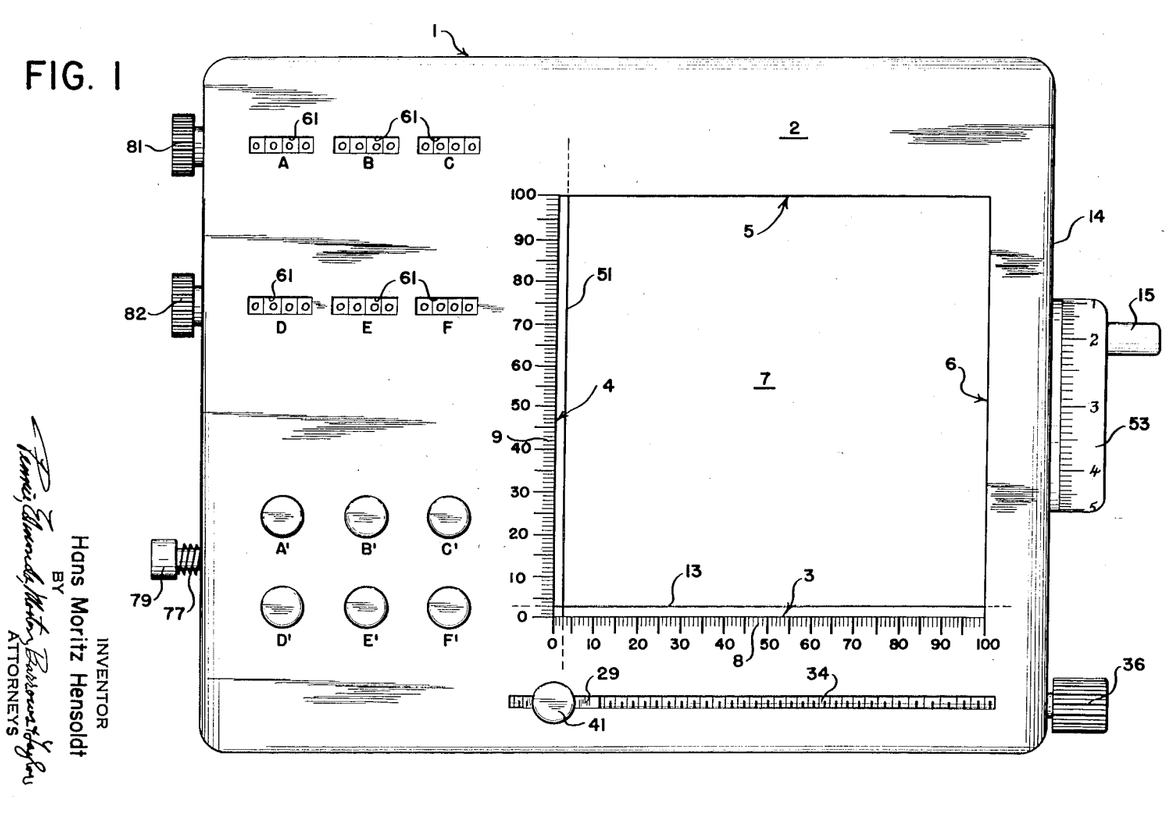
Fig. 1 is a top or plan view of the device.
Figure 2:
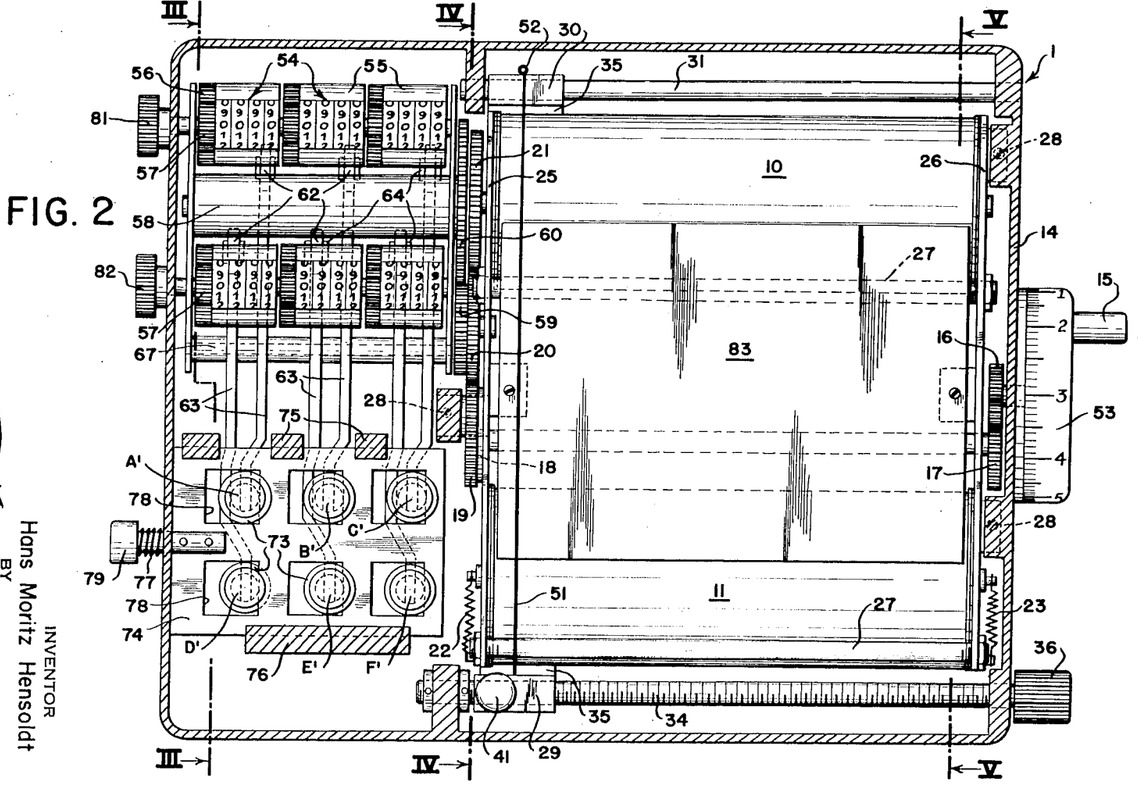
Fig. 2 is a horizontal sectional view of the device taken directly under the cover so that the casing cover is removed.
Figure 3:
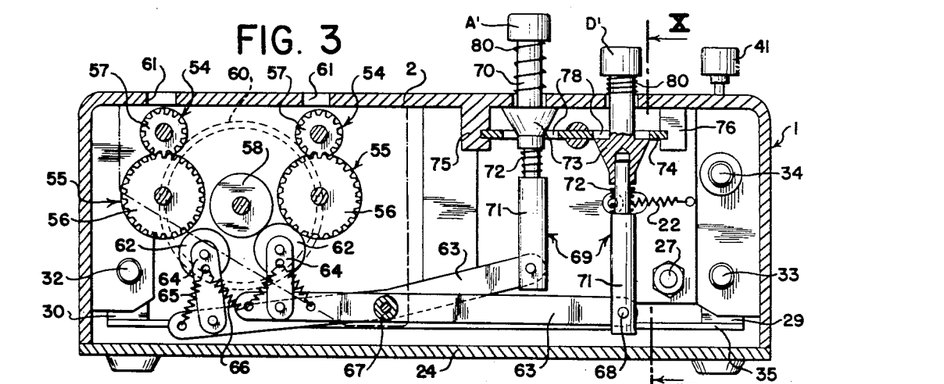
Figs. 3 to 5 are vertical cross sections through the device respectively along the lines III—III, IV—IV and V—V of Fig. 2.

Since the reading of the individual measured length with the abscissa on the scale 9 is still time-consuming, the motion of the abscissa is transmitted to a counter assembly consisting of several individual counters which agrees with the scale graduation 9. The number of the individual counters has to be selected according to the composition of the material to be evaluated. In the represented example there are six individual counters A to F. Each counter consists in known manner of cipher disks 54, which are driven by a counter roller 55 from a pair of gear wheels 56, 57 (Figs. 2 and 3). The individual counters can be arranged in the casing side by side or in series. Preferably they are arranged side by side and combined in groups for example, counters A to C and D to F, which in turn are arranged in the casing in series from the front to the rear. This arrangement permits a compact design and makes it possible to operate with only one common driving roller 58 for the individual counter rollers 55. This driving roller is arranged in the middle between the counter rollers and is driven through a pair of gear wheels 59, 60, the gear wheel 59 being connected rigidly and coaxially with the gear wheel 20 of the conveyer roller drives, for example, and the gear wheel 60 being similarly connected with the driving roller 58. The transmission gearing is so selected that the reading of the counter agrees with the graduation of the marginal scale 9 for the motion of the abscissa. The gear wheels of the conveyer roller drive are so arranged that the frame consisting of the side bars 25, 26 can be removed at the bottom from the casing 1, without any hindrance by the gear wheels. Small windows 61 are provided in the cover surface 2 of the casing to make the readings of the individual counters visible.

To each counter roller 55 and the driving roller 58 is assigned a pressure roller 62 (Fig. 3) which is supported at one end of a rocking lever 63 by means of a tongue 64.

The tongue can perform small angular motions with regard to the rocking lever 63 so that the pressure roller 62 is sure to abut on the counter roller and driving roller, adjusting itself automatically. The angle deflections of the tongue are limited by special stops, for example, on the rocking lever 63 or, as represented in the drawing, by small springs 65, 66, engaging the tongue and the lever. Each rocking lever 63 is thus designed as a two-arm lever, mounted suitably on a rock shaft 67 secured in the casing and provided at its end opposite the pressure roller 62 with a key such as keys A' to F', preferably protruding from the cover surface 2, with the interposition of a shaft 69 articulated to the lever 63 with a pivot bolt 68. This shaft 69 consists of two parts 70, 71, which can be displaced relative to each other and between which a compression spring 72 is clamped and so dimensioned that it becomes effective only if the pressure rollers 62 engage (Figs. 3 and 10). At the inner end of the shaft part 70 is arranged a safety member, for example a safety cone 73 pointing downward which, as described below, forms together with the safety plate 74 a lock for the pressure roller 62 in their operating position. The safety plate 74 is so arranged that it can be displaced horizontally in guides 75, 76 of the casing and is under the action of a spring 77 so that it is always pulled to the left, for example. The safety plate has for each safety cone a hole 78 which can be square, as represented, or round. Its inner diameter must correspond to the maximum diameter of the safety cone 73. The safety plate can be displaced from the outside by means of a knob-shaped handle 79.

The individual counters are connected and secured in the operating position as follows.

Let us assume that all counters are out of operation. If the counter D is to be connected, for example, the corresponding key D' (Fig. 3) is pressed down and the pressure roller 62 assigned to the counter D engages the driving roller 58 and transmits the revolution, effected by the crank 15, from the driving roller 58 to the counter roller 55 which in turn drives the counter D. When actuating the key D' the safety cone 73 is displaced from the position shown in broken lines in Fig. 10 and by its oblique surface forces the plate 74 so far to the right that the cone has completely passed through the plate (full lines). At this moment the safety plate moves again to the left under the action of the compression spring 77 and extends over the cone so that it cannot return by itself into its starting position, in spite of the return spring 80 arranged between the casing and the key. The compression spring 72 arranged between the shaft parts 70, 71 always effects a uniform abutment or engagement of the pressure roller 62 on the driving roller 58 and the counter roller 55.

If another counter, for example counter F, is to be connected and the counter D to be put out of operation, the key F' is pressed down. Its safety cone 73 again moves the safety plate 74 so far to the right that it can pass completely through the plate. At the time of its complete penetration the safety cone of the previously actuated key D' is in such a position that it returns automatically through the hole in the safety plate under the action of the return spring 80. If the counter connected last is to be put out of operation, the safety plate 74 is pushed from the outside by means of the handle 79 so far to the right that the safety cone of this counter can slide back automatically through the hole in the safety plate. The individual counters A to F are brought into zero position in known manner by turning the knobs 81 and 82 (Fig. 2).

The individual measured lengths of the partial areas passed over by the abscissa 13 in the measuring field 7 are added currently by the individual counters connected with the drive of the conveyer rollers 10 and 11 so that after the evaluation of the photogram, for example, the total length of the individual measured lengths can be read immediately. This is achieved in such a way that an individual counter is determined for each type of particle occurring in the photogram and that the corresponding counter is always connected when passing from one type to the other, putting the preceding counter out of operation.

The performance of a measurement with the application of the counter arrangement will be explained again by means of Fig. 9. Assume that the measurement has already been carried out to the position of the ordinate 51 on the graduation "40" of the lower scale 8 and to the position of the abscissa 13 on the graduation "36" on the left scale 9. The partial surfaces of the masses $a$ to $e$ visible in the measuring field 7, are associated with the counters A to E in the same order. The corresponding counter is always connected at that moment when the intersection between the abscissa 13 and the ordinate 51 coincides with the contact point between the two mass surfaces $a$ and $d$. In the position of the abscissa shown in Fig. 9, the counter D is to be connected by actuating the key D' which puts the previously connected counter A out of operation. The scanning is again effected along the ordinate 51. The counter D remains connected until the abscissa 13 has reached the next contact point between $d$ and $a$ by actuating the hand crank 15. Now the counter A is connected again until the abscissa 13 coincides with the contact point between $a$ and $e$. When the counter A is connected, the counter D is put out of operation. When the abscissa has reached the contact point between $a$ and $e$, the counter E is connected and the counter A is disconnected automatically and the operation continues in the same manner. The individual values of the lengths determined by the abscissa in each passage from the bottom to the top edge of the measuring field are registered automatically and currently by the connection of the corresponding counter, so that at the end of the measurement for each type of mass particle the total length can be read from the associated counter. If this length is multiplied by scale jump of the ordinate 51, used continuously, we obtain the total area which each type of mass occupies on the measuring surface.

In the position of the ordinate shown in Fig. 9 the individual counters must be switched as follows: A—$5x$ (5 times), B—$2x$, C—$1x$, D—$1x$ and E—$1x$.

As already mentioned, the device is not only suitable for evaluating area patterns projected on the measuring field, but the patterns can also be inserted as photos or diapositives into the measuring field. To this end a plate-shaped support 83 (Fig. 5) is provided underneath the upper paper web between the conveyer rollers 10 and 11. This support is preferably transparent and can be illuminated by means of a light source 84 housed in the casing of the device. In this case the paper web 12 must also be transparent if the evaluation is to be effected by means of the coordinate system. The support 83 can serve as a screen itself and be completely free of any recordings, depending on the type of evaluation to be performed, but it can also be provided with a defined area, a grid, etc. In this case the paper web 12 can be omitted. The support used as a screen can also be inserted in the cutout limiting the measuring field. This possibility is utilized particularly when different plane profile sections have to be examined and the coordinate system scanning the measuring field is not required.

Figure 11:
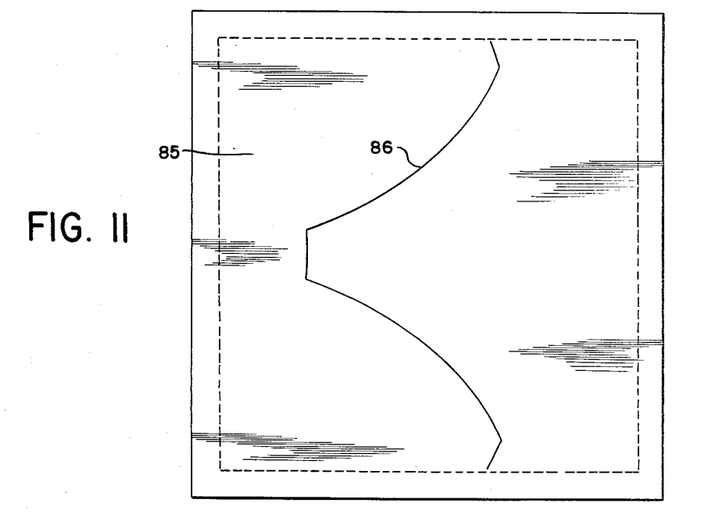
Fig. 11 is a top view of an insertable screen with profile drawing.

If we have to test, for example, the flank profile of a very small gear wheel for this accuracy to measure, as it happens in fine mechanics, a screen in the form of a gauge plate 85 (Fig. 11) is inserted in the cutout of the measuring field, on which the profile of the tooth flanks 86 is recorded or etched on a greatly enlarged scale. The image of the gear wheel to be examined is then projected on the screen in suitable manner corresponding to the scale of the gauge plate. The profile lines of the gauge plate and of the projected gear wheel are made to coincide. Due to the great enlargement we can determine immediately any deviation by comparison with the profile section existing on the screen.

Figure 12:
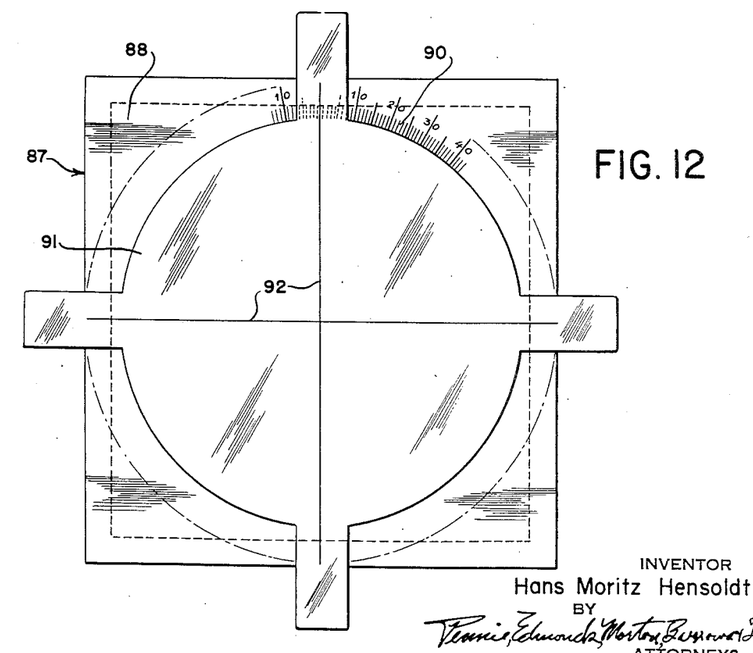
Fig. 12 is a top view of an insertable screen designed as a goniometer.

The screen to be inserted can also be designed as a goniometer 87 as shown in Fig. 12. This goniometer consists preferably of a base plate 88 with a degree of angle division on an annular surface 90. The base plate contains also a revolving disk 91 with a rectangular coordinate system 92 passing through the center. If the image of an object is projected enlarged on the measuring field of the instrument, in this case on the goniometer 87, we can measure in a simple manner any angle of the respective object by turning the revolving disk 91, for example, the cutting angle of a precision drill or the conical end of small bearing journals, as they are used in the watch industry.

The application of the above described universal measuring indicator is naturally not limited to the described possibilities. They rather have to be considered as special simple examples to illustrate the method of operation of the instrument. The instrument itself can be modified within the framework of the invention. Thus for example, the casing can be disk-shaped with a cover surface inclined toward the viewer. The feed of the steel wire forming the ordinate can be effected in dependence on the feed of the abscissa, in this way that after each passage of the abscissa the ordinate jumps ahead by a certain predetermined scale value. Instead of using the paper loop carrying the abscissa as a screen it is possible to use only the fixed support which is illuminated from the bottom. As carriers for the abscissa assembly or assemblies, when the fixed surface is used, two narrow endless belts can be used which run at the sides of the conveyer rollers and between which the necessary abscissas are arranged. It is also possible to provide an additional counter which registers the individual operations of the counters A to F.

What is claimed as new is:

1. A device, including a measuring field provided with a screen, for carrying out evaluations, measurements, comparison tests and the like of area or line patterns presented for measurement in the measuring field of the device, said device comprising a casing having a cover presenting a cover surface, the measuring field being formed by a rectangular cut-out in the cover of the casing, the screen comprising an endless web operable beneath the cover across the measuring field, a pair of spaced conveyer rollers on which said endless web is mounted for operation, a scanning means including means providing a variable rectangular coordinate system including abscissa means and ordinate means, one of the coordinates of the coordinate system comprising a thin transverse line on the endless web, marginal scales on the cover surface along sides of the measuring field for respectively reading the abscissa and the ordinate of the coordinate system, means for moving the abscissa means and the ordinate means across the measuring field, and a counter means mechanically connected with at least one of the moving means for recording the coordinate measurements on the measuring field of the coordinate means mechanically connected with the counter means.

2. A device as claimed in claim 1, characterized by including a mechanism connecting the counter means with the means for moving the abscissa means, said counter means comprising several individual counters of which only one is connectible at a time with the moving means.

3. A device as claimed in claim 2, characterized by including a driving roller common to all of the individual counters, the individual counters being arranged side by side in parallel along the common driving roller, and a driving connection between the common driving roller and the means for moving the abscissa means.

4. A device as claimed in claim 3, characterized by including a counter roller for each counter, a pressure roller for each of the counters, the pressure roller being arranged between the common driving roller and the counter roller, and an operating lever for moving the pressure roller into engagement with the common driving roller and the counter roller.

5. A device as claimed in claim 4, characterized in that each operating lever is a two-arm rocking lever, each pressure roller is supported at one end of said two-arm rocking lever arranged in the casing by means of a tongue articulated to said end of the rocking lever with limited angular deflection, a press key arranged at the other end of each rocking lever, and a lock with which the press key cooperates for locking the key in its pressed position to thereby hold the pressure roller abutting on the common driving roller and the counter roller.

6. A device as claimed in claim 5, characterized in that the lock includes a stop at the key and a displaceable spring-biased safety plate.

7. A device as claimed in claim 6, characterized in that the stop at each key is in the form of a safety cone operable by the key and pointing in the pressing direction of the key, and that the safety plate is provided with a through hole for each cone, the safety plate being automatically displaceable over the safety cone of the actuated key to hold the associated pressure roller in abutting position on the common driving roller and the associated counter roller.

8. A device as claimed in claim 7, characterized in that the safety plate and safety cones are so arranged that actuation of a second key automatically releases a previously locked key and at the same time is locked in a holding position, the safety plate being first moved by actuating the second key through the action of its safety cone in moving the safety plate from its locking position until it releases the safety cone of the first key, the safety plate then moving automatically over the safety cone of the last actuated key.

9. A device as claimed in claim 1, characterized by including a support in the casing between the upper portions of the conveyer rollers in approximately the plane of the upper run of the endless web.

10. A device, including a measuring field provided with a screen, for carrying out evaluations, measurements, comparison tests and the like of area or line patterns presented for measurement in the measuring field of the device, said device comprising a casing having a cover presenting a cover surface, the measuring field being formed by a rectangular cut-out in the cover of the casing, the screen comprising an endless web having a circumference which is an even multiple of the dimension of the measuring field in the direction of movement of the web and operable beneath the cover across the measuring field, a pair of spaced conveyer rollers on which said endless web is mounted for operation, a scanning means including means providing a variable rectangular coordinate system including abscissa means and ordinate means, one of the coordinates of the coordinate system comprising a plurality of transverse lines on the endless web spaced by said dimension, marginal scales on the cover surface along sides of the measuring field for respectively reading the abscissa and the ordinate of the coordinate system, means for moving the abscissa means and the ordinate means across the measuring field, and a counter means mechanically connected with at least one of the moving means for recording the coordinate measurements on the measuring field of the coordinate means mechanically connected with the counter means.

11. A device as claimed in claim 10, characterized in one of the conveyer rollers is a tension roller for the endless web.

12. A device as claimed in claim 11, characterized by including a frame readily insertable in the casing in which the conveyer rollers are supported, and means supported in said frame for driving at least one of said conveyer rollers.

13. A device, including a measuring field provided with a screen, for carrying out evaluations, measurements, comparison tests and the like of area or line patterns presented for measurement in the measuring field of the device, said device comprising a casing having a cover presenting a cover surface, the measuring field being formed by a rectangular cut-out in the cover of the casing, the screen comprising an endless web belt operable in the casing beneath the cover across the measuring field with its upper surface adjacent the cut-out in the cover of the casing, a pair of spaced conveyer rollers in the casing on which said endless web belt operates, a scanning means including means providing a variable rectangular coordinate system including abscissa means and ordinate means, the abscissa means being carried by the web belt, means including a gear train for driving one of said conveyer rollers, marginal scales on the cover surface along sides of the measuring field for respectively reading the abscissa and the ordinate of the coordinate system, means for moving the ordinate means across the measuring field, a counter means, and means interconnected with one of the gears of the said gear train for driving the counter means, whereby values measured by the abscissa means when the web belt is moved are recorded by the counter means.

References Cited in the file of this patent

UNITED STATES PATENTS

| | | |
|---|---|---|
| 1,076,275 | Freeman | Oct. 21, 1913 |
| 1,376,768 | Hess | May 3, 1921 |
| 2,360,361 | Mountbatten | Oct. 17, 1944 |
| 2,368,761 | Hogan | Feb. 6, 1945 |
| 2,481,563 | Bevins | Sept. 13, 1949 |
| 2,500,935 | Deitz | Mar. 21, 1950 |
| 2,600,484 | Copping | June 17, 1952 |
| 2,708,070 | Fiechter | May 10, 1955 |

FOREIGN PATENTS

| | | |
|---|---|---|
| 411,602 | Italy | Mar. 5, 1945 |